US010462831B2

(12) United States Patent  
Melman

(10) Patent No.: US 10,462,831 B2  
(45) Date of Patent: Oct. 29, 2019

(54) SYSTEM AND METHOD FOR ESTABLISHING A TEMPORARY ELECTRONIC COMMUNICATION CHANNEL TO ALLOW AN INTRODUCTION OF OPERATORS OF ELECTRONIC COMMUNICATION CAPABLE DEVICES

(71) Applicant: John J. Melman, Atlanta, GA (US)

(72) Inventor: John J. Melman, Atlanta, GA (US)

( * ) Notice: Subject to any disclaimer, the term of this patent is extended or adjusted under 35 U.S.C. 154(b) by 277 days.

(21) Appl. No.: 15/633,091

(22) Filed: Jun. 26, 2017

(65) Prior Publication Data

US 2018/0376518 A1 Dec. 27, 2018

(51) Int. Cl.
| | |
|---|---|
| *H04W 76/14* | (2018.01) |
| *H04L 29/06* | (2006.01) |
| *H04W 8/00* | (2009.01) |
| *H04W 4/70* | (2018.01) |

(52) U.S. Cl.
CPC ......... *H04W 76/14* (2018.02); *H04L 63/0869* (2013.01); *H04W 8/005* (2013.01); *H04L 63/068* (2013.01); *H04W 4/70* (2018.02)

(58) Field of Classification Search  
None  
See application file for complete search history.

(56) References Cited

U.S. PATENT DOCUMENTS

| | | | |
|---|---|---|---|
| 5,862,325 A | 1/1999 | Reed et al. | |
| 7,877,783 B1 | 1/2011 | Cline et al. | |
| 8,849,233 B2 | 9/2014 | Hauser et al. | |
| 9,203,824 B1* | 12/2015 | Nunn | H04L 63/08 |
| 2013/0262857 A1* | 10/2013 | Neuman | H04L 63/08 |
| | | | 713/155 |
| 2014/0112200 A1 | 4/2014 | Lor et al. | |
| 2014/0197232 A1* | 7/2014 | Birkler | G06F 21/313 |
| | | | 235/375 |
| 2014/0289759 A1* | 9/2014 | Nakano | G06Q 30/06 |
| | | | 725/31 |
| 2015/0056967 A1 | 2/2015 | Bartlett et al. | |
| 2015/0084757 A1* | 3/2015 | Annibale | G08B 25/10 |
| | | | 340/436 |
| 2017/0006114 A1* | 1/2017 | Mande | H04L 67/148 |
| 2017/0300732 A1* | 10/2017 | Likar | H04L 67/306 |
| 2018/0208448 A1* | 7/2018 | Zimmerman | B67D 1/0888 |
| 2019/0089717 A1* | 3/2019 | Dolev | G06F 16/9535 |

FOREIGN PATENT DOCUMENTS

EP 2518957 A1 10/2012

* cited by examiner

*Primary Examiner* — Kaveh Abrishamkar

(57) ABSTRACT

Introductions of the users of electronic communication capable devices can be made temporarily with each other. In one example, a first device presents, visually, audibly, electronically or otherwise, a code that may be received by one or more other devices, either visually, audibly, electronically or otherwise. The code can be used to establish a path for communications, for a predetermined finite period of time, to allow the users to exchange references or profiles with each other without revealing either user's true identity or other personally identifying information, including that which is associated with the mobile or other devices involved in the communication, unless or until a user chooses to do so.

20 Claims, 3 Drawing Sheets

SYSTEM AND METHOD FOR ESTABLISHING A TEMPORARY ELECTRONIC COMMUNICATION CHANNEL TO ALLOW AN INTRODUCTION OF OPERATORS OF ELECTRONIC COMMUNICATION CAPABLE DEVICES

TECHNICAL FIELD

This disclosure relates generally to electronic communication systems. More specifically, but not by way of limitation, this disclosure relates to establishing communication between two or more devices controlled by users prior to the users exchanging personally identifiable information with each other.

BACKGROUND

Many people frequently operate electronic communication devices, including cell phones, smartphones, tablets, laptops, and desktops, that may be capable of various types of electronic communications with others. For example, such devices may allow users to participate in voice communications, text communications, picture exchanges, video conferencing, and the like. Automobiles, planes, trains, buses, buildings, business establishments, and various other entities can also include devices capable of exchanging electronic communication in conjunction with the aforementioned electronic communication capable devices or on their own. An example of an electronic communication capable device is a user device, such as a network enabled mobile phone, tablet, or laptop.

There is a need for users of such devices to be able to directly establish communications pathways with one another without disclosing more personally identifiable information than they choose. For example, there is a need for users to be able to communicate without needing to be physically nearby each other, speak directly to each other, or to coordinate through other external computer programs or systems that rely upon mapping, GPS or similar location services.

Additionally, users may want to communicate with others electronically for only a short period of time. For example, the nature of some conversations may be such that further conversation is not necessary. In other examples, users may not want to have a long conversation. For example, a user at a restaurant may wish to communicate with someone else at the restaurant, such as another patron. But the user may want to communicate without exchanging personal information and without establishing a relationship longer than a few minutes. Should the two users wish to maintain communication by, for example, exchanging phone numbers or email addresses, they may do so on their own initiative.

Establishing a communication channel without a user providing or receiving personally identifiable information is challenging. Personally identifiable information is used by systems that facilitate two users communicating to establish and maintain communication channels.

SUMMARY

In one example, a system includes a server device that has a processing device and a non-transitory computer-readable medium. The non-transitory computer-readable medium is configured for storing a first user private profile, a second user private profile, and a communication link management engine. The first user private profile is associated with a first user ID that is representative of the first user. The second user private profile is associated with a second user identifier that is representative of a second user. The communication link management engine is executable by the processing device to:

receive a request for a randomly generated code from a first user device that is controllable by the first user and that is configured for electronically communicating via a network, the request identifying or being associated with the first user ID;

provide the first user device with access to the code and associate the code with the first user private profile;

receive the code from a second user device that received the code in a channel other than through the server device from the first user, the code being received by the server device with or associated with the second user ID; and in response to receiving the code from the second user device, associate the code to the second user private profile to allow the first user device to communicate electronically with the second user device through a communication link established by the server device, for a predetermined finite period of time, without requiring the first user and the second user to exchange personally identifiable information prior to the communication link being established.

In another example, a method is provided that includes a server device receiving a request for a randomly generated code from a first user device controlled by a first user. The code is generated. The server device provides the first user device with access to the code and associates the code to a first user private profile that is associated with a first user identifier that is representative of the first user. The server device receives the code from a second user device that is controlled by a second user and that received the code in a channel other than through the server device from the first user. In response to receiving the code from the second user device, the code is associated to a second user private profile that is associated with a second user identifier representative of the second user, to allow the first user device to communicate electronically with the second user device through a communication channel established by the server device, for a predetermined finite period of time, without requiring the first user and the second user to exchange personally identifiable information prior to the communication channel being established.

In a further example, a non-transitory, computer-readable storage medium is provided on which instructions are stored that are executable by a processor device to cause the processor device to perform actions. The actions can include receiving a request for a randomly generated code from a first user device that is controllable by the first user and that is configured for electronically communicating via a network. The request identifies or is associated with a first user identifier. The actions can further include providing the first user device with access to the code and associating the code with a first user private profile. The actions can further include receiving the code from a second user device that received the code in a channel other than through a server device from the first user. The code is associated with a second user identifier. In response to receiving the code from the second user device, the actions can further include associating the code to a second user private profile to allow the first user device to communicate electronically with the second user device through a communication channel established by the server device, for a predetermined finite period of time, without requiring the first user and the second user to exchange personally identifiable information prior to the communication channel being established.

DETAILED DESCRIPTION

Figure 1:
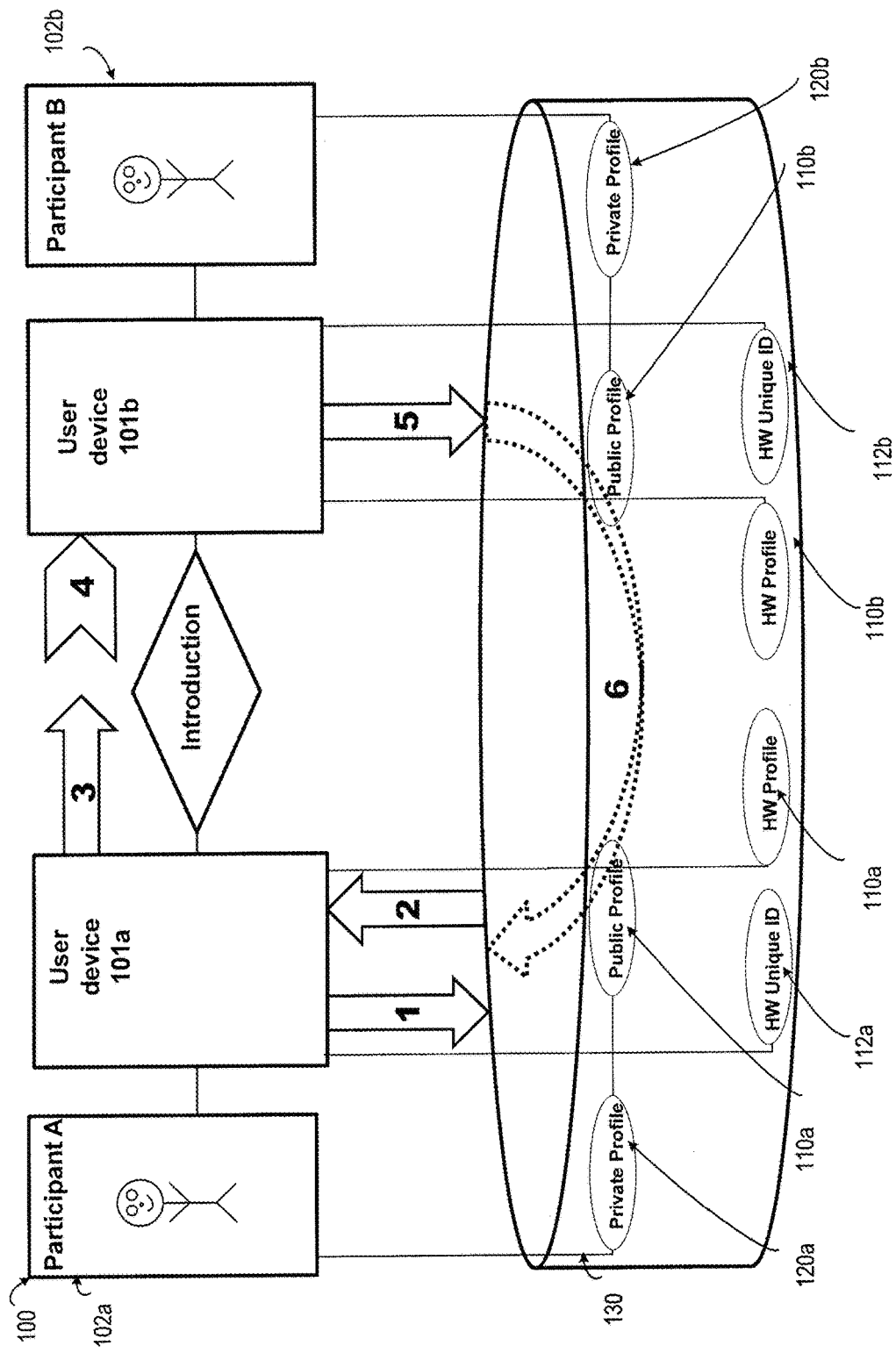
FIG. 1 is a diagram depicting an environment for establishing, prior to users exchanging personally identifiable information, a communications channel through which users can communicate, according to one aspect of the present disclosure.

Certain aspects and features relate to allowing users of electronic devices to establish electronic communication pathways with like users by having the devices exchange, visually, audibly, electronically, or otherwise, an identifying code directly with one another. This identifying code may then be transmitted to and be processed by the system to establish a secure electronic communications channel (i.e., link) between the devices and associated users without necessitating the exchange of any personally identifiable information prior to the communications channel being established.

According to some examples, the communications channel may remain intact and effective for only a predesignated period of time, after which the established secure anonymous communications channel may automatically be terminated. The predesignated period of time may be selected or set to be any time. An example of a range of times for the predesignated period of time is ten seconds to twenty-four hours. The communications channel may be incapable of reestablishment by the devices or users, unless the users restart the process by exchanging, visually, audibly, electronically or otherwise, a new and randomly generated code.

An electronically capable communications device can transmit, visually, audible, electronically, or otherwise, a randomly generated code that is an identifier key to another electronically capable communications device. The randomly generated code can identify the participants, or users, and the user devices of the communication system to a communications server. The second device can receive and decipher the code and a communications link, channel, or pathway can be established without requiring personally identifiable information of the users or devices with other users or devices. Once shared, the communication system may anonymously map the randomly generated code to the initiating user and device and establish an electronic communications channel brokered by this computer program product and system. A communications system can implement the secure anonymous communications channel using the randomly generated code. The communication server can avoid identifying the participants, users, or user devices to each other. Only the server may know the identities of the participants, users, or user devices.

Implementing communication systems that preserve anonymity is difficult at least because communications systems inherently require a unique identifier for both the source and the destination. For example, in the case of a telephone system, a phone number is used as an identifier. A phone number uniquely identifies the source and another phone number uniquely identifies the destination. But phone numbers may have an associated name that can be discovered, for example, by looking in a directory, rendering anonymous communication impossible.

A communications system according to some examples can eliminate the need for participants to directly or indirectly exchange any Personally Identifiable Information (PII) to communicate with each other. A presenting participant can obtain a randomly generated code from a communications server. When the presenting participant is connected, or logged on, to a communication server through a device, the participant can convey the randomly generated code via a channel other than through the communications system to a receiving participant. Examples of the other channel include the participant visually displaying a representation of the code, such as a Quick Response (QR) code, and providing an audio signature of the code.

The receiving participant may receive the randomly generated code via the channel other than through the communications system. The receiving participant's device may receive and display the public profile of the presenter. The receiving participant may be offered several options, such as but not limited to acceptance or denial of the secure anonymous communications channel, accepting the default time or choosing a new specific time term of the channel, or choosing which of possible multiple public profiles to share. When a secure anonymous communications channel is accepted, the designated public profile of the receiving participant as well as the time term of this connection is shared with the conveying participant. Participants may use this channel to communicate textually, verbally, audibly, visually, electronically between each other.

Using a randomly generated code can allow a communication system to establish and maintain a secure anonymous communications channel while maintaining user anonymity, because the randomly generated code uniquely identifies the users or devices without containing personally identifiable information. The communication system, for example, a communications server acting as an intermediary, may know the identity of the device or user that requested the secure anonymous communications channel, but the communications server can keep the identity of the user and device private from any other users or devices. The randomly generated code can be used to identify the communication between the first device and the second device, but can avoid identifying each device to the other device, and vice versa.

In some examples, a communications channel is only established and enabled for a predetermined period of time, after which the communications pathway is automatically broken and cannot be reestablished unless a new randomly generated code is exchanged in establishing a new mapping between the entities wishing to communicate with each other. The period of time may be short, sometimes as brief as ten seconds, or as long as several days, after which time the randomly generated code can expire and be incapable of establishing the secure anonymous communications channel. Random codes can be continually generated and provided to the user through the device upon demand.

Participants may have public and private profiles associated with user identifiers. The user identifiers can be representative of the users, which are also referred to as participants. A public profile may be flexible in accommodating as little as a single attribute and as many as several dozen, for example. Public profile attributes include non-personally identifiable information to help the two (or more) participants identify each other in the physical world (e.g., automobile description, human hair, eye, or skin color, legal business name of a public transit system, picture, etc.) A private profile can contain personally identifiable information.

Electronic security and encryption of logs and device or user associations can also be included. For example, access can be limited to only those users and administrators of the system specifically designated as requiring access, and access from other users and devices can be restricted.

FIG. 1 is a diagram depicting an environment for establishing a communications channel between multiple devices according to one aspect of the present disclosure. FIG. 1 depicts a communications system 100 capable of establishing a secure anonymous communications channel. The communications system 100 may include a communications server 130 that can include a processor device that can execute code stored on a non-transitory, computer-readable medium. For example, an application such as a communication link management engine may be executed by the communications server 130.

A first user device 101a and a second user device 101b may be associated with participants, such as participant A 102a and participant B 102b. Participant A 102a can be an entity capable of initiating, accepting or interacting with another participant such as participant B 102b. One or more of participant A 102a or participant B 102b can be humans or robotic devices, such as chat bots or other devices with artificial intelligence or machine learning capabilities.

The first user device 101a and second user device 101b can be devices for sending, receiving, and interacting with at least one type of code generated and transmitted by the communications system 100. The code may be transmitted visually, audibly (e.g., through an audio channel), electronically, or otherwise. Examples of the first user device 101a and second user device 101b include cell phones, smart phones, tablets, laptops, and desktops. The first user device 101a and second user device 101b can send and receive digital data via TCP/IP or other protocols.

Public profiles can be used by participants to share limited information with other participants. Participant A 102a may have a first user public profile 110a and participant B 102b a second user public profile 110b. The first user public profile 110a and the second user public profile 110b may not include any PII. PII may include information that identifies a user when considered alone or in connection with other information. Examples of PII include a name, address, telephone number, username, a first user ID, and a second user ID. The first user public profile 110a and the second user public profile 110b may include elements such as a generic description (e.g. a physical attribute) or generic title (e.g. "user A"), but upon a participant's choosing, may also include PII, such as a business name.

The first user public profile 110a and the second user public profile 110b may not be used by the communication system 100 for establishing a communications channel between the participants. Rather, the first user public profile 110a and the second user public profile 110b may be shared with another participant and facilitate physical identification or exchanging other information. The first user public profile 110a may be stored on first user device 101a, or on the communications server 130. Similarly, public profile 110b may be stored on second user device 101b, or on the communications server 130.

In contrast, private profiles of participants may not be shared with other participants and may contain personal information. Participant A 102a may have a first user private profile 120a associated with a first user identifier that is representative of a first user, or participant A. Participant B 102b may a second user private profile 120b that is associated with a second user identifier that is representative of a second user, or participant B. First user private profile 120a and second user private profile 120b may include PII, such as an email address, telephone number, social media account, professional profile, business information, or anything that can be used alone or with other information to identity a user. In some examples, a user may have multiple private profiles, for example, a personal private profile and a business private profile. Participant A 102a may have a personal private profile and a private profile for professional purposes. First user private profile 120a and second user private profile 120b may be maintained by the communications server 130 or within the user devices 101a-b. User profiles can be non-permanently associated with one or more participating devices logged within the communication server 130.

The communication system 100 may use user identifiers. The user identifiers, or user IDs, can be used to ensure that users can log-on to the system using any user device. The communication server 130 may associate a first user identifier with the first user device 101a. Similarly, the communication server 130 may associate a second user identifier with the second user device 101b. Participant A may communicate using multiple devices, e.g., phone, tablet, or computer. A user may have multiple user devices 101a-n operating in association with one user identifier. For example, a user may send a message on one device, then send a message later on another device, all associated with one user identifier. Provided that participant A is logged in with the first user identifier, communication may be sent or received across a secure anonymous communications channel on any user device 101a-n.

Participant A 102a and participant B 102b may have hardware unique identifiers 112a-b. Hardware unique identifiers 112a-b may be UDIDs (Unique Device Identifiers), IMEIs (International Mobile Equipment Identities), MEID (Mobile Equipment Identifiers), ESNs (Electronic Serial Numbers), MACs (Media Access Control) Addresses, IP (Internet Protocol) Addresses or another unique identifier. Hardware profiles 110a-b can include information helpful to the communication system 100 in understanding how best to interact with user devices 101a-b. Hardware profiles 110a-b can include device type, manufacturer, model, etc. Hardware unique identifiers 112a-b may not be shared with any other entity.

The communication server 130 can associate the randomly generated code with first user device 101a to facilitate secure anonymous communication. The communication server 130 may associate a first user identifier with the first user device 101a. Similarly, the communication server 130 may associate a second user identifier with the second user device 101b. A user may have multiple user devices operating in association with one user identifier. For example, a user may send a message on one device, then send a message later on another device, all associated with one user identifier.

The first user private profile 120a and the second user private profile 120b and their associations with users, participants, and devices, may be secured, for example, using encryption. This digital association may be maintained under some level of security by the communications system 100 and is not intended to be shared with any entity other than the appropriate participant.

With application software capable of operating within a variety of operating systems on various devices capable of TCP/IP communication acting as a front-end, and software such as databases acting as a back-end, the communication server 130 can establish, maintain, and automatically terminate secure anonymous electronic communication channels. By using the randomly generated code, the communications server can prevent itself from sharing PII with participant A 102*a* and participant B 102*b*, or user devices 101*a-b*. But the participants themselves may share PII in communications through the communication channel. For example, participant A 102*a* and participant B 102*b* may decide to exchange information, such as phone number or email address, to meet up at a subsequent time.

FIG. 1 also shows examples of actions, numbered 1-6, that can be performed to establish the secure anonymous communications channel.

In an example, participant A 102*a* desires to communicate with participant B 102*b*. In action 1, participant A 102*a* connects with, or logs on to, communication server 130 and requests a code. The communication server 130 can receive the request from participant A 102*a* from first user device 101*a*. The communication server 130 can generate a randomly generated code. The randomly generated code may be used by the communication server 130 to establish the secure anonymous communications channel and preserve anonymity between user A and user B.

The user devices 101*a-b* may have one or more unique profiles created to identify themselves within the communications system 100. For example, the first user device 101*a* and second user device 101*b* may have private profiles 120*a-b* and public profiles 110*a-b*. The communication server 130 may assign the randomly generated code to the first user private profile 120*a*. In some examples, a user may choose to share a public profile with the other user. In another example, a user may view the other user's public profile in conjunction with a request to communicate. In a further example, an association may be made between first user device 101*a* and a hardware unique identifier 112*a*.

The communication server 130 generates and makes available a random and unique code to participant A 102*a* in action 2. The communication server 130 can assign the code to the first user private profile 120*a*. The first user private profile 120*a* can be the primary identifier of participant A. The communication server 130 can allow the code to be accessed in a suitable format by participant A 102*a* via the first user device 101*a*.

The randomly generated code can be shared or otherwise presented by Participant A 102*a*, visually, audibly, electronically or otherwise, to Participant B 102*b* in an out-of-band channel to the communications server 130 in action 3. Doing so may be considered or represent an "introduction." An out-of-band channel can be one that does not include the communications server 130 but is one by which the code can be presented so that it is received and interpreted by an electronically communicable capable device of another participant with an account established with the communications server 130. Examples of the out-of-band channel include visually showing the code to the other user, audibly speaking the code, displaying the code on a display device or a sign, and electronic channels other than the communications server 130. For example, the code may be optically scanned by Participant B 102*b* or by a device controlled by Participant B 102*b*.

Upon participant B 102*b* desiring to communicate with participant A 102*a* through the communications channel, participant B 102*b* can acquire the code and provide the code to the second user device 101*b* for storage in an acceptable format in action 4. In some examples, one or more of participants A and B 102*a-b* are machines or non-human entities that can communicate directly with the communications server 130, rather than through user devices.

Participant B 102*b* can provide or convey the code to the communications server 130 in action 5 while logged into the system if Participant B 102*b* would like to communicate with Participant A 102*a*. Doing so can authorize, from the perspective of Participant B 102*b*, the communications server 130 to establish a temporary, auto-terminating anonymous electronic communications pathway to which Participant A 102*a* may be offered by the communications server 130 options, such as acceptance or denial, term, public profile, etc.

The communication server 130 establishes a secure anonymous communications channel that is temporary and auto-terminating in action 6. Using executable, interactive types of software capable of operating within a variety of operating systems on a plethora of devices capable of TCP/IP communication acting as a front-end, and executable, applications, interactive and database types of software acting as a back-end, the communications server 130 can establish, maintain, and automatically terminate anonymous pathways of electronic communications. Among other operations, the communications server 130 can (i) generate on-demand, random unique identifying key(s), (ii) accept and use the unique identifying key(s) to broker an electronic communications link/pathway, and (iii) maintain, and then automatically terminate based upon a predefined time period, the electronic communications link/pathway.

For example, the communications server 130 can employ a random character, non-duplicative in time, software program to generate unique identifying codes/keys, and serve them to the requesting Participant via TCP/IP to the device of the Participant. A client software application can be included that is designed to make use of hardware, such as but not limited to cameras, microphones, Wi-Fi/Bluetooth, and electronic communication chips included with the accepting device to receive the physically proximate-presented code and then convey it into the communications server 130 that can use it to temporarily associate a database's row (e.g., a private profile) with this specific instance of an electronic communications link/pathway. Accepting the private profile can be automatically included in the link based upon user log-on. The communications server 130 may employ a relational database including numerous tables. There may be a table for private profiles. There may be a table for public profiles. A code may be inserted into a column of the private profile of the requesting Participant, acting as one of this record's primary keys for a predefined and adjustable period of time, after which time it may be overwritten with a designated default non-assigned code. When a Participant logs onto the communications server 130 through whatever device conveys a code, the software of the respective presenting device may receive and display the public profile of the conveyor. Based upon this, the presenting Participant may be offered several options, such as but not limited to: acceptance or denial of the communications link, default or specific time term of the link, which of possible multiple public profiles to share, etc. When a link is accepted, the designated public profile of the presenting Participant as well as the time term of this connection is shared with the conveying Participant. Participants may use this link to communicate textually, verbally, audibly, visually, electronically among each other. Once the selected time term of the connection has expired, it will be broken and neither participant will be capable of reestablishing communication through the communication server 130 unless another code is acquired and exchanged.

Upon termination of the secure anonymous communications channel, one or both of the participants may be presented an option to establish a new secure anonymous communications channel. Participant A 102a may be presented with an option to re-establish communication with participant B 102b via a new secure anonymous communications channel. The communications server 130 may generate a new randomly generated code and reinitiate the process described herein.

Figure 2:
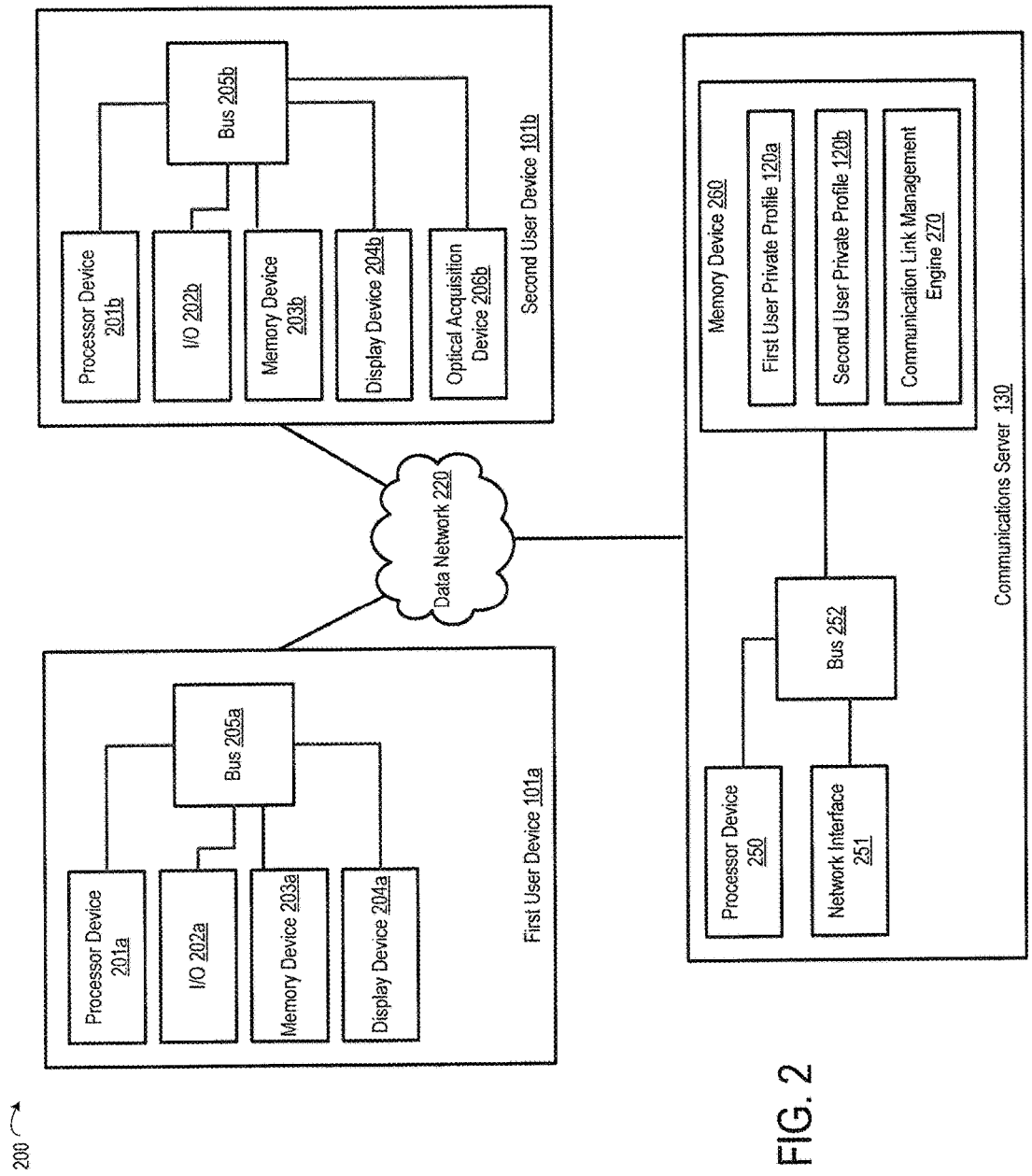
FIG. 2 is a block diagram of an example of a communication system for establishing a communications channel according to one aspect of the present disclosure.

FIG. 2 is a block diagram of an example of a communication system for establishing a secure anonymous communications channel between two devices according to one aspect of the present disclosure. The communication system 200 includes first user device 101a, second user device 101b, and a communications server 130. Two user devices 101a-b are shown, but any number of user devices is possible. Examples of user devices 101a-b include cellular phones, tablet computers, laptop computers, desktop computers, etc. The communications server 130 may be implemented in a variety of different ways, such as being a server, a desktop computer, or another portable computing device.

First user device 101a and second user device 101b can be communicatively coupled to the communications server 130 via the data network 220. Examples of the data network 220 include, but are not limited to, a cellular network, the Internet, a local area network ("LAN"), a wireless area network, a wired network, a wide area network, a Bluetooth network, and any combination of these or other types of networks. The first user device 101a and second user device 101b can have respective network identities, such as IP addresses or MAC addresses. The communications server 130 may communicate with first user device 101a and second user device 101b.

The first user device 101a and second user device 101b may include processor devices 201a-b, I/O devices 202a-b, memory devices 203a-b, and display devices 204a-b communicatively coupled via busses 205a-b. The processor devices 201a-b can execute computer-executable program code or access data stored in memory devices 203a-b. Examples of processor devices 201a-b include a microprocessor, an application-specific integrated circuit ("ASIC"), a field-programmable gate array ("FPGA"), or any other suitable processing device. The processor devices 201a-b can include any number of processing devices or cores, including a single processing device. The processing devices 201a-b may execute application software capable of performing the tasks described herein associated with establishing, sending, and receiving secure anonymous communications, for example, via the communications server 130.

The first user device 101a and second user device 101b may also include a number of external or internal devices, such as input or output devices. For example, the first user device 101a and second user device 101b are shown with input/output ("I/O") devices 202a-b. The I/O devices 202a-b may be any kind of input/output device or port, such as a USB port, serial port, parallel port, etc. The I/O devices 202a-b may also be used for diagnostic functions.

Memory devices 203a-b can include suitable non-transitory computer-readable medium for storing data, program code, or both. A computer-readable medium can include any electronic, optical, magnetic, or other storage device capable of providing a processor with computer-readable instructions or other program code. Non-limiting examples of a computer-readable medium include a flash memory, a ROM, a RAM, an ASIC, or any other medium from which a processing device can read instructions. The instructions may include processor-specific instructions generated by a compiler or an interpreter from code written in any suitable computer-programming language, including, for example, C, C++, C#, Visual Basic, Java, or scripting language such as Python, Perl, etc.

Busses 205a-b can also be included in the communications server 130. The busses 205a-b can be communicatively coupled to one or more components of a respective one of the communications server 130. The busses 205a-b may be any kind of bus, such as PCI Express, etc.

Display devices 204a-b may be any kind of display device such as a touch screen, LCD screen, computer monitor, tablet screen, etc. Display devices 204a-b may be used for displaying messages, pictures, videos, or other content received by the communication system or for other purposes. Display devices 204a-b may also be used to display messages or information from the communications server 130. For example, the first user device 101a or second user device 101b may facilitate requests via a graphical user interface.

One or both devices may include optical acquisition devices. In FIG. 2, the second user device 101b include an optical acquisition device 206b, which can be used to acquire a visual representation of the unique random code optically by scanning it with the optical acquisition device 206b. Examples of the optical acquisition device 206b include a camera or a bar code reader. For example, in a system implemented on a smart phone, a smart phone camera can be used as an optical acquisition device to acquire the randomly generated code.

Communications server 130 may implement functionality as described with respect to FIG. 1. Communications server 130 may implement functions in software or hardware. Communications server 130 includes a processor device 250, a network interface 251, and a memory device 260, communicatively coupled via a bus 252.

The processor device 250 can execute computer-executable program code or access data stored in memory device 260. Examples of processor device 250 include a microprocessor, an ASIC, an FPGA, or any other suitable processing device. The processor device 250 can include any number of processing devices or cores, including a single processing device. The processor device 250 may execute application software capable of performing the tasks described herein associated with establishing, sending, and receiving secure anonymous communications, for example, from the first user device 101a or the second user device 101b.

Communications server 130 also includes a network interface 251. The network interface 251 includes any device or group of devices suitable for establishing a wired or wireless data connection to one or more data networks. The network interface 251 may be a wireless-communication capable device.

Memory device 260 may include a first user private profile 120a and a second user private profile 120b. For example, to establish the secure anonymous communications channel, the processor device 250 can store the first user private profile 120a and the second user private profile 120b with the code. The memory device 260 may also store the code or data for a communication link management engine 270.

The communication link management engine 270 can establish, maintain, and disconnect the secure electronic communication channel. For example, the communication link management engine 270 can provide the randomly generated code to a first user device 101a when requested, or allow the first user device 101a to access the code. The communication link management engine 270 can associate, in a data structure, database, or via some other mechanism, the randomly generated code and the first user private profile 120a. The communication link management engine 270 can receive the randomly generated code from the second user device 101b and associate the second user private profile 120b with the randomly generated code. Once the secure anonymous communication channel is established, the communication link management engine 270 can maintain the channel until the predetermined finite period of time has been reached.

Figure 3:
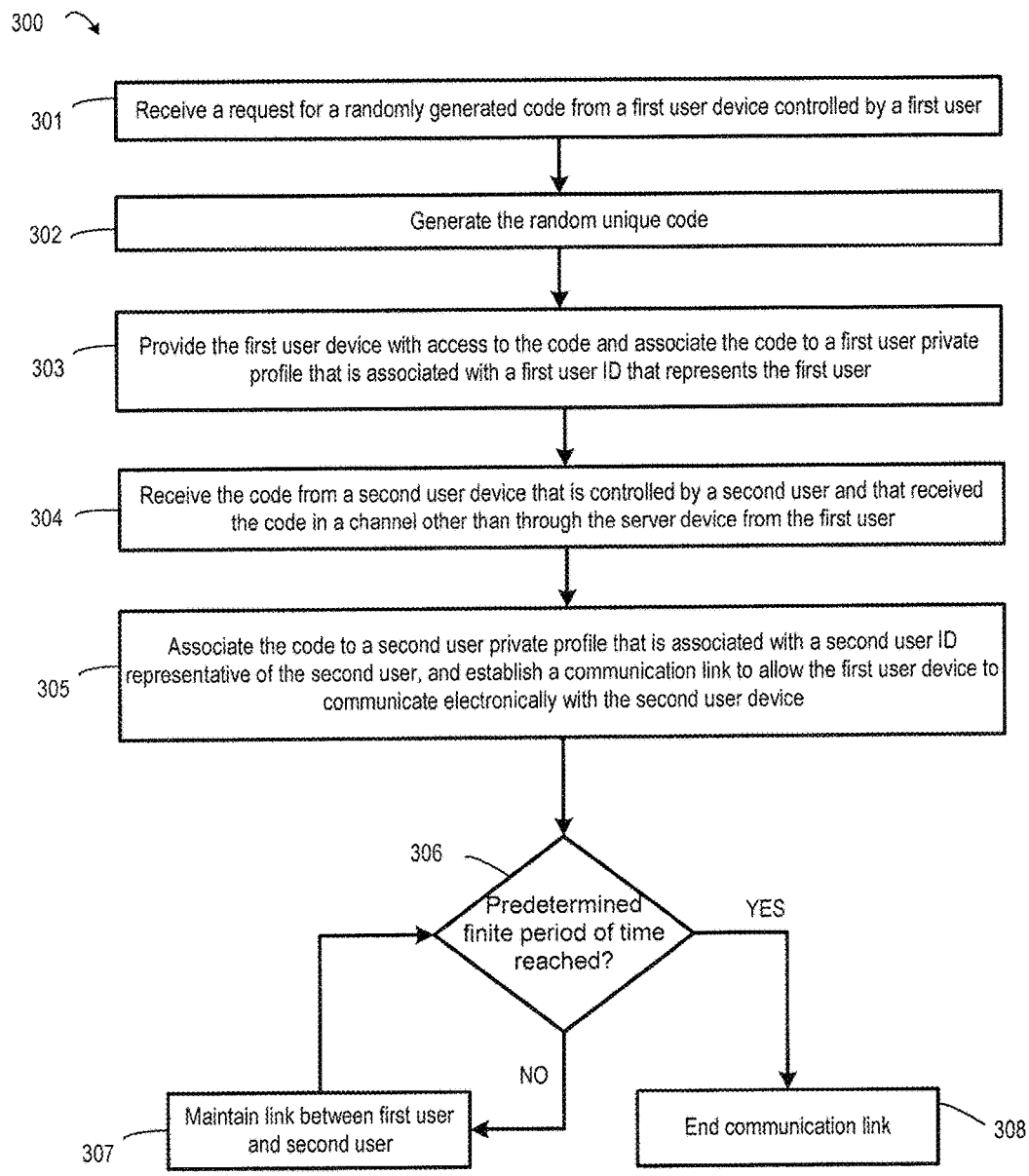
FIG. 3 is a flowchart depicting an example of a process for establishing communications channel between users according to one aspect of the present disclosure.

FIG. 3 is a flowchart depicting an example of a process 300 used to establish a secure anonymous communications channel between users according to one aspect of the present disclosure. The process 300 depicted in FIG. 3 may be implemented by the communications server 130 of FIGS. 1 and 2.

At block 301, a request for a randomly generated code is received from a first user device controlled by a first user. For example, a first user may be a patron at a restaurant that wishes to allow a diner at the restaurant to communicate with the patron anonymously for a few hours while the diner is in the restaurant. The patron can log onto the communication system with a first user device and request a new randomly generated code. The request can be received by the communication system electronically from the first user device over a network.

At block 302, the randomly generated code can be generated. The code can be generated "on-demand" in the sense that the code did not exist prior to the system receiving the request for the code but is generated contemporaneously to receiving the request. The code can be in the form of random characters and is non-duplicative in time.

At block 303, the first user device is provided with access to the code and the code is associated to a first user private profile that is associated with a first user identifier that represents the first user. In some examples, the communications server 130 may transmit the code to the first user device. In other examples, the communications server 130 may provide the first user with the ability to access the code, such as by allowing the first user device to obtain the code, such as by optically scanning a visual representation of the code via an optical recognition device.

At block 304, the code is received from a second user device that is controlled by a second user and that received the code in a channel other than through the server device from the first user. The code may be received from a channel other than through the communications server 130. Examples of a channel other than through the communications server include an electronic channel established directly between user devices, an optical channel by which a displayed representation of the code is captured, an audio channel from which an audio signature is captured, and a manual input channel that includes a user manually entering the code into the device.

For example, the first user may wear an electronic nametag that receives the randomly generated code from the first user device and displays the randomly generated code. The second user can optically obtain the code from the electronic nametag and provide the code to the communications server 130. Or the code may be represented by sound received by an audio capture device. In other examples, the code may be manually entered into a device using a keyboard, or read to the device and captured by voice recognition.

At block 305, the code is associated to a second user private profile that is associated with a second user identifier representative of the second user. And a communication link is established to allow the first user device to communicate electronically with the second user device. The communication link can be established without requiring the first user and the second user to exchange personally identifiable information prior to the communication link being established. And users can choose to communicate anonymously or not through the communication link. While the communication server 130 can prevent PII from being shared among the users, the users themselves can share PII in communicating through the communication link.

The communication link can be temporary and be set to expire after a pre-set amount of time has lapsed. At block 306, the communications server 130 determines whether the predetermined finite period of time has been reached. For example, the predetermined finite period of time can be a time within a range of ten seconds to twenty-four hours. In other examples, the predetermined finite period of time is in a range of one day to ten days.

If the predetermined finite period of time has not been reached, the communications server 130 maintains the communication link between the first user and the second user in block 307, and the process returns to block 306 to determine, again, whether the predetermined finite period of time is reached. If the predetermined finite period of time has been reached, the communications link is terminated or ended at block 308.

In some examples, the communications server 130 includes electronic security and encryption of the logs and associations that is designed to limit access to only those users and administrators of the computer program and system specifically designated as requiring this relational information. Read access is prevented from most end users and end devices.

And maintaining the link for a finite period of time may reduce the number of communication links maintained by the communications server 130 because each link terminates automatically. If the established communication links remain active, for example, if the users have either ceased communicating or moved their conversations to a different forum, resources of the communications server 130 may be wasted. If such communications links are maintained, the communications server 130 may require the use of more processor power to maintain the links. Additionally, the communications server 130 may require the use of more memory within memory device 260 because each link association may need to be maintained in memory. For example, for each established communications link, the communications link management engine 270 may store a significant amount of data such as the association between users, user identifiers, first user private profile 120a, second user private profile 120b, and a random unique code. By permitting the removal of the data associated with terminated communications links, processor and memory efficiency can be improved.

While the present subject matter has been described in detail with respect to specific aspects thereof, it will be appreciated that those skilled in the art, upon attaining an understanding of the foregoing, may readily produce alterations to, variations of, and equivalents to such aspects. Any aspects or examples may be combined with any other aspects or examples. Accordingly, it should be understood that the present disclosure has been presented for purposes of example rather than limitation, and does not preclude inclusion of such modifications, variations, or additions to the present subject matter as would be readily apparent to one of ordinary skill in the art.

What is claimed is:

1. A system comprising:
a server device comprising a processing device and a non-transitory computer-readable medium that is configured for storing:
   a first user private profile that is associated with a first user ID and that stores personally identifiable information of a first user;
   a first user public profile that stores data describing a physical attribute of at least one of the first user or a physical object associated with the first user;
   a second user private profile that is associated with a second user ID and that stores personally identifiable information of a second user;
   a second user public profile that stores data describing a physical attribute of at least one of the second user or a physical object associated with the second user; and
a communication link management engine that is executable by the processing device to:
   receive a request for a code from a first user device that is controllable by the first user and that is configured for electronically communicating via a network, the request identifying or being associated with the first user ID;
   provide the first user device with access to the code and associate the code with the first user private profile;
   receive the code from a second user device that received the code in a channel other than through the server device from the first user, the code being received by the server device with the second user ID or associated with the second user ID; and
   in response to receiving the code from the second user device, associate the code to the second user private profile, establish a communication link between the first user device and the second user device to allow the first user device to communicate electronically with the second user device for a predetermined finite period of time,
   apply permissions to the communication link that:
      permit the second user device to access, from the first user public profile and during the predetermined finite period of time, the physical attribute of the at least one of the first user or the physical object associated with the first user,
      prohibit the second user device from accessing, from the first user private profile, the personally identifiable information of the first user that is stored in the first user private profile,
      permit the first user device to access, from the second user public profile and during the predetermined finite period of time, the physical attribute of the at least one of the second user or the physical object associated with the second user, and
      prohibit the first user device from accessing, from the second user private profile, the personally identifiable information of the second user that is stored in the second user private profile.

2. The system of claim 1, wherein at least one of the first user or the second user is a machine with artificial intelligence.

3. The system of claim 1, wherein the communication link management engine is further executable by the processing device to randomly generate the code, wherein the system further comprises:
the first user device and the second user device, wherein the second user device is configured to receive, in the channel that is independent of the server device, the code (i) electronically from the first user device, (ii) by capturing a displayed representation of the code, (iii) from an audio signature, or (iv) as input from the second user.

4. The system of claim 3, wherein the channel includes an optical acquisition device on the second user device that is configured to optically capture a visual representation of the code.

5. The system of claim 1, wherein at least one of the personally identifiable information of the first user or the personally identifiable information of the second user includes at least one of a legal name, a user ID, a geographic address, or a telephone number.

6. The system of claim 1, wherein the predetermined finite period of time is a period of time between ten seconds and twenty-four hours, wherein the server device is configured to receive a selection of the predetermined finite period of time from the first user device.

7. The system of claim 1, wherein the personally identifiable information includes information by which the first user or the second user is identifiable with the information alone or combined with other information.

8. The system of claim 1, wherein the server device is configured to establish the communication link for the predetermined finite period of time to permit communication between the first user and the second user temporarily with an option for anonymity and reduce an amount of communication links maintained by the server device.

9. The system of claim 1, wherein the first user ID is specific to the first user, wherein the communication link management engine is further configured to:
   receive, from the first user device, the first user ID as a logon credential prior to establishing the communication link;
   receive, from a third user device, the first user ID as the logon credential subsequent to establishing the communication link and prior to the predetermined finite period of time expiring;
   based on receiving the first user ID from the third user device, update the permissions of the communication link to:
      permit the third user device to access, from the second user public profile and during the predetermined finite period of time, the physical attribute of the at least one of the second user or the physical object associated with the second user, and
      prohibit the third user device from accessing, from the second user private profile, the personally identifiable information of the second user that is stored in the second user private profile.

10. The system of claim 9, wherein the communication link management engine is further configured to maintain, during the predetermined finite period of time, the access of the first user device to the second user public profile after permitting the third user device to access the second user public profile.

11. A method comprising:
receiving, by a server device, a request for a code from a first user device controlled by a first user;
generating the code;
providing, by the server device, the first user device with access to the code and associating the code to a first user private profile that is associated with a first user ID and that stores personally identifiable information of the first user;

receiving, by the server device, the code from a second user device that is controlled by a second user and that received the code in a channel other than through the server device from the first user;
in response to receiving the code from the second user device:
associating, by the server device, the code to a second user private profile that is associated with a second user ID and that stores personally identifiable information of the second user,
establishing, by the server device, a communication link between the first user device and the second user device, to allow the first user device to communicate electronically with the second user device for a predetermined finite period of time
accessing, by the server device, (i) a first user public profile that stores data describing a physical attribute of at least one of the first user or a physical object associated with the first user and (ii) a second user public profile that stores data describing a physical attribute of at least one of the second user or a physical object associated with the second user; and
applying, by the server device, permissions to the communication link that:
permit the second user device to access, from the first user public profile and during the predetermined finite period of time, the physical attribute of the at least one of the first user or the physical object associated with the first user,
prohibit the second user device from accessing, from the first user private profile, the personally identifiable information of the first user that is stored in the first user private profile,
permit the first user device to access, from the second user public profile and during the predetermined finite period of time, the physical attribute of the at least one of the second user or the physical object associated with the second user, and
prohibit the first user device from accessing, from the second user private profile, the personally identifiable information of the second user that is stored in the second user private profile.

12. The method of claim 11, wherein the channel is independent of the server device and includes (i) an electronic channel from the first user device, (ii) an optical channel by which a displayed representation of the code is captured, (iii) an audio channel from which an audio signature is captured, or (iv) a manual input channel from which input from the second user is received.

13. The method of claim 11, wherein at least one of the first user or the second user is a machine with artificial intelligence.

14. The method of claim 11, wherein at least one of the personally identifiable information of the first user or the personally identifiable information of the second user includes at least one of a legal name, a user ID, a geographic address, or a telephone number.

15. The method of claim 11, wherein the predetermined finite period of time is a period of time between ten seconds and twenty-four hours, the method further comprising:
receiving, by the server device, a selection of the predetermined finite period of time from the first user device.

16. The method of claim 11, wherein the personally identifiable information comprises information by which the first user or the second user is identifiable with the information alone or combined with other information.

17. The method of claim 11, further comprising:
establishing, by the server device, the communication link for the predetermined finite period of time to permit communication between the first user and the second user temporarily with an option for anonymity and to reduce an amount of communication links maintained by the server device.

18. A non-transitory computer-readable storage medium on which instructions are stored that are executable by a processor device to cause the processor device to:
receive a request for a code from a first user device that is controllable by a first user and that is configured for electronically communicating via a network, the request identifying or being associated with a first user ID;
provide the first user device with access to the code and associate the code with a first user private profile that is associated with the first user ID and that stores personally identifiable information of the first user;
receive the code from a second user device that is controllable by a second user and that received the code in a channel other than through a server device from the first user, the code being associated with a second user ID;
in response to receiving the code from the second user device:
associate the code to a second user private profile that is associated with the second user ID and the stores personally identifiable information of the second user,
establish a communication link between the first user device and the second user device to allow the first user device to communicate electronically with the second user device for a predetermined finite period of time
access (i) a first user public profile that stores data describing a physical attribute of at least one of the first user or a physical object associated with the first user and (ii) a second user public profile that stores data describing a physical attribute of at least one of the second user or a physical object associated with the second user; and
apply permissions to the communication link that:
permit the second user device to access, from the first user public profile and during the predetermined finite period of time, the physical attribute of the at least one of the first user or the physical object associated with the first user,
prohibit the second user device from accessing, from the first user private profile, the personally identifiable information of the first user that is stored in the first user private profile,
permit the first user device to access, from the second user public profile and during the predetermined finite period of time, the physical attribute of the at least one of the second user or the physical object associated with the second user, and
prohibit the first user device from accessing, from the second user private profile, the personally identifiable information of the second user that is stored in the second user private profile.

19. The non-transitory computer-readable storage medium of claim 18, wherein the predetermined finite period of time is a period of time between ten seconds and twenty-four hours, wherein the instructions are further executable by the processor device to cause the processor device to:

receive a selection of the predetermined finite period of time from the first user device.

20. The non-transitory computer-readable storage medium of claim 18, wherein at least one of the first user or the second user is a machine with artificial intelligence.

\* \* \* \* \*